(12) United States Patent
Ghosh et al.

(10) Patent No.: US 9,725,322 B2
(45) Date of Patent: Aug. 8, 2017

(54) HIGHLY DENSE NANO-CARBON FOAM WITH CONTROLLED POROSITY SYNTHESIZED FROM HOLLOW CARBON NANOPARTICLES

(71) Applicant: National University of Singapore, Singapore (SG)

(72) Inventors: Arunabha Ghosh, Singapore (SG); Jonghak Lee, Singapore (SG); Srinivasan Natarajan, Singapore (SG); Barbaros Oezyilmaz, Singapore (SG); Antonio Helio Castro Neto, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 14/790,513

(22) Filed: Jul. 2, 2015

(65) Prior Publication Data

US 2016/0002044 A1 Jan. 7, 2016

Related U.S. Application Data

(60) Provisional application No. 62/020,531, filed on Jul. 3, 2014.

(51) Int. Cl.
*C01B 31/02* (2006.01)
*B82Y 40/00* (2011.01)
*C01B 31/00* (2006.01)

(52) U.S. Cl.
CPC .......... *C01B 31/0293* (2013.01); *C01B 31/00* (2013.01); *C01P 2006/12* (2013.01); *C01P 2006/14* (2013.01)

(58) Field of Classification Search
CPC .................... C01B 31/0293; B82Y 40/00
See application file for complete search history.

(56) References Cited

U.S. PATENT DOCUMENTS

| 5,744,510 A | * | 4/1998 | Pekala | C08G 8/06 264/29.1 |
| 2008/0277284 A1 | * | 11/2008 | Nesbitt | B01J 20/20 205/80 |
| 2009/0061191 A1 | | 3/2009 | Zhamu et al. | |
| 2012/0045384 A1 | | 2/2012 | Muramatsu et al. | |
| 2016/0272498 A1 | | 9/2016 | Lee et al. | |

FOREIGN PATENT DOCUMENTS

WO WO 2013/066269 A1 5/2013
WO WO 2015/072926 A1 5/2015

OTHER PUBLICATIONS

Lion Specialty Chemicals Co., Ltd. "Ketjenblack Highly Electro-Conductive Carbon Black". [online] [retrieved Sep. 7, 2016]. Retrieved from the Internet <URL: https://www.lion-specialty-chem.co.jp/en/product/carbon/ carbon01.htm>.*

(Continued)

*Primary Examiner* — Erin Snelting
(74) *Attorney, Agent, or Firm* — Hamilton, Brook, Smith & Reynolds, P.C.

(57) ABSTRACT

Hot pressing hollow carbon nanoparticles results in a nano-carbon foam that can be used for energy storage, carbon dioxide capture or water desalination.

10 Claims, 9 Drawing Sheets

(56) References Cited

OTHER PUBLICATIONS

AkzoNobel. "Ketjenblack® EC-600JD powder". Apr. 2011, pp. 1-2.*
Ali, Ashraf A., et al., "Hot-pressed Electrospun PAN nano fibers: An Idea for Flexible Carbon Mat.," Journal of Materials processing Technology, 2009, vol. 209, No. 9, pp. 4617-4620.
Caldwell, Marissa A., et al., "Synthesis and Size-dependent Crystallization of Colloidal Germanium Telluride Nanoparticles," Royal Society of Chemistry, 2010, J. Mater. Chem., 2010, vol. 20, pp. 1285-1291.
Childres, Isaac, et al., "Raman Spectroscopy of Graphene and Related Materials," Chapter 19 of New Developments in Photon and Materials Research (Joon I. Jang, Ed.) (Jul. 8, 2013).
Cooper, Daniel R., et al., "Experimental Review of Graphene," ISRN Condensed Matter Physics, vol. 2012, Article ID 501686, (Accepted Nov. 3, 2011) Copyright 2012.
Fedorov, A.V. and Shulgin, A.V., "Mathematical Modeling of Melting of Nano-Sized Metal Particles," Combustion, Explosion, and Shock Waves, vol. 47, No. 2, pp. 147-152, 2011.
Ghosh, Arunabha and Lee, Y.H., "Carbon-Based Electrochemical Capacitors," ChemSusChem 2012, vol. 5, pp. 480-499.
Ji, Hengxing, et al., "Ultrathin Graphite Foam: A Three-Dimensional Conductive Network for Battery Electrodes," Nano Letters, 2012, vol. 12, pp. 2446-2451 (and Supporting Information).
Jorio, Ado, et al., "Measuring Disorder in Graphene With Raman Spectroscopy," (2011), Physics and Applications of Graphene—Experiments, Dr. Sergey Mikhailov (Ed.), ISBN: 978-953-307-217-3.

Marco-Lozar, J.P., et al., "Activated Carbon Monoliths for Gas Storage at Room Temperature," Energy & Environmental Science, 2012, vol. 5, pp. 9833-9842.
Moore, A.W., et al., "Stress Recrystallization of Pyrolytic Graphite," Proceedings of The Royal Society of London, A 1964 280, pp. 153-169.
Valov, P.M. and Leĭman, V.I., "Size Effects in Melting and Crystallization Temperatures of Copper Chloride Nanocrystals in Glass," 1997 American Institute of Physics, Fiz. 66, No. 7, pp. 481-486, Oct. 10, 1997.
Xia, Yongde, et al., "Porous Carbon-Based Materials for Hydrogen Storage: Advancement and Challenges," Journal of Materials Chemistry A, 2013 vol. 1, pp. 9365-9381.
Yang, Zhi-Yu, et al., "Sponge-Templated Preparation of High Surface Area Graphene With Ultrahigh Capacitive Deionization Performance," Advance Functional Materials, 2014, vol. 24, pp. 3917-3925.
Zhang, Yupeng, et al., "High Quality Graphene Sheets From Graphene Oxide by Hot-Pressing,", Carbon, Nov. 14, 2012, vol. 54, pp. 143-148.
Notification of Transmittal of the International Search Report and the Written Opinion of the International Searching Authority mailed Feb. 25, 2015 for International Application No. PCT/SG2014/000539 filed Nov. 17, 2014, entitled "Hot Press Induced Formation of an Ordered Graphene and Few Layered Graphene Sheets".
Chung, D.D.L., "Review Graphite", *Journal of Materials Science*, 37: 1475-1489 (2002).
Notification Concerning Transmittal of International Preliminary Report on Patentability for International Application No. PCT/SG2014/000539. entitled "Hot Press Induced Formation of an Ordered Graphene and Few Layered Graphene Sheets", Date of Mailing: May 26, 2016.

* cited by examiner

HIGHLY DENSE NANO-CARBON FOAM WITH CONTROLLED POROSITY SYNTHESIZED FROM HOLLOW CARBON NANOPARTICLES

RELATED APPLICATION(S)

This application claims the benefit of U.S. Provisional Application No. 62/020,531, filed on Jul. 3, 2014, the entire teachings of which are incorporated herein by reference.

BACKGROUND OF THE INVENTION

Energy storage, such as in supercapacitors, is important in order to improve energy efficiency. Additionally, carbon dioxide capture is becoming important in order to reduce the quantity of greenhouse gases in the atmosphere. Nano-carbon foams can be used as electrodes in supercapacitors, and they can also be used to capture carbon dioxide. However, existing methods of preparing nano-carbon foam are not suitable for large scale industrial production. For example, chemical solution-based methods often require a significant number of pre- and post-processing steps, and they result in the generation of chemical waste. Therefore, improved methods of making nano-carbon foams are desirable, particularly methods that are suitable for industrial scale production.

SUMMARY OF THE INVENTION

Described herein is a method of making a nano-carbon foam and the nano-carbon foam made thereby. The method can include hot pressing hollow carbon nanoparticles at a pressure between about 10 MPa and about 120 MPa at a temperature between about 500° C. and about 2100° C. for a duration between about 5 minutes and about 60 minutes, thereby forming nano-carbon foam. In some instances, the pressure is about 40 MPa. The method can further include activating the nano-carbon foam with $CO_2$. In some instances, the nano-carbon foam has a volumetric surface area between about 125 $m^2$ $cc^{-1}$ and 578 $m^2$ $cc^{-1}$. In some instances, the nano-carbon foam has a total pore volume between about 0.23 cc $g^{-1}$ and about 1.35 cc $g^{-1}$. In some instances, the nano-carbon foam has a micropore volume between about 0.002 cc $g^{-1}$ and 0.19 cc $g^{-1}$. In some instances, the nano-carbon foam has a mesopore volume between about 0.23 cc $g^{-1}$ and 1.22 cc $g^{-1}$. In some instances, the nano-carbon foam has a density between about 0.361 g $cc^{-1}$ and 0.95 g $cc^{-1}$. In some instances, the hollow carbon nanoparticles have a void fraction of at least, or in some cases about, 80%. In some instances, the hollow carbon nanoparticles have a surface area of at least, or in some cases about, 1400 $m^2$/g. In some instances, the nano-carbon foam has conductivity of at least $10^2$ S $cm^{-1}$.

The hot pressing method for forming a nano-carbon foam provides many benefits compared to other methods of forming a nano-carbon foam. In particular, the methods can be used to control the porosity of the resultant nano-carbon foam. The nano-carbon foam can be a self-standing three dimensional structure that can be directly used in many different applications. For example, the nano-carbon foam can be used as an electrode for supercapacitors without requiring conductive additives and binders. Reducing or eliminating conductive additives and binders in an electrode is desirable because the binders and conductive additives reduce the amount of total energy storage per unit mass and per unit volume and hinder performance severely.

Additionally, the methods described are far simpler and require fewer pre- and post-processing steps, and in some instances no pre- or post-processing steps are required. In contrast, chemical processes for making nano-carbon foam typically require filtration (e.g., from reduced graphene oxide), or chemical treatments followed by annealing (e.g., from polymers). These steps are time-consuming and costly, and therefore chemical process methods are not suitable for commercial-scale production of nano-carbon foams. Consequently, the hot pressing method described herein can provide nano-carbon foam having a higher degree of chemical purity, which likely contributes to improved stability, particularly compared to chemical process-based approaches, in part because chemical reagents and surfactants are not required.

The methods described herein can be used to make nano-carbon foams having both micropores and mesopores, which have different pore diameters and are preferred for different applications or purpose (e.g., in supercapacitors, maximizing energy density and maximizing power density are two different purpose within the same application). A greater percentage of micropores is preferred for energy storage (e.g., supercapacitors) because it maximizes energy density. A greater percentage of mesopores is preferred for higher power density because it permits faster charging and discharging. A suitable combination of micropores and mesopores is crucial in order to optimize both energy and power density of a supercapacitor. An important benefit of the hot pressing method is that it provides excellent control over relative amounts of micropores and mesopores simply by controlling the temperature and pressure at which the hot pressing is performed. Controlling pore structure is far more difficult with chemical solution processes.

Many different types of carbon materials are known in the art, such as amorphous carbons from different raw materials (e.g., coke, soot, char, coal or resin-based carbon, carbide-driven carbon, etc.), carbon nanotubes, carbon nanofibers, graphite flakes, exfoliated graphite nano particles etc. Among all these, hot pressing hollow carbon nanoparticles results in a unique nano-carbon foam. The hollow carbon nanoparticles have excellent mechanical strength, which helps to prevent structural collapse/stacking of the carbon nanoparticles during pressing, thereby successfully preserving the porosity of the resultant nano-carbon foam.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
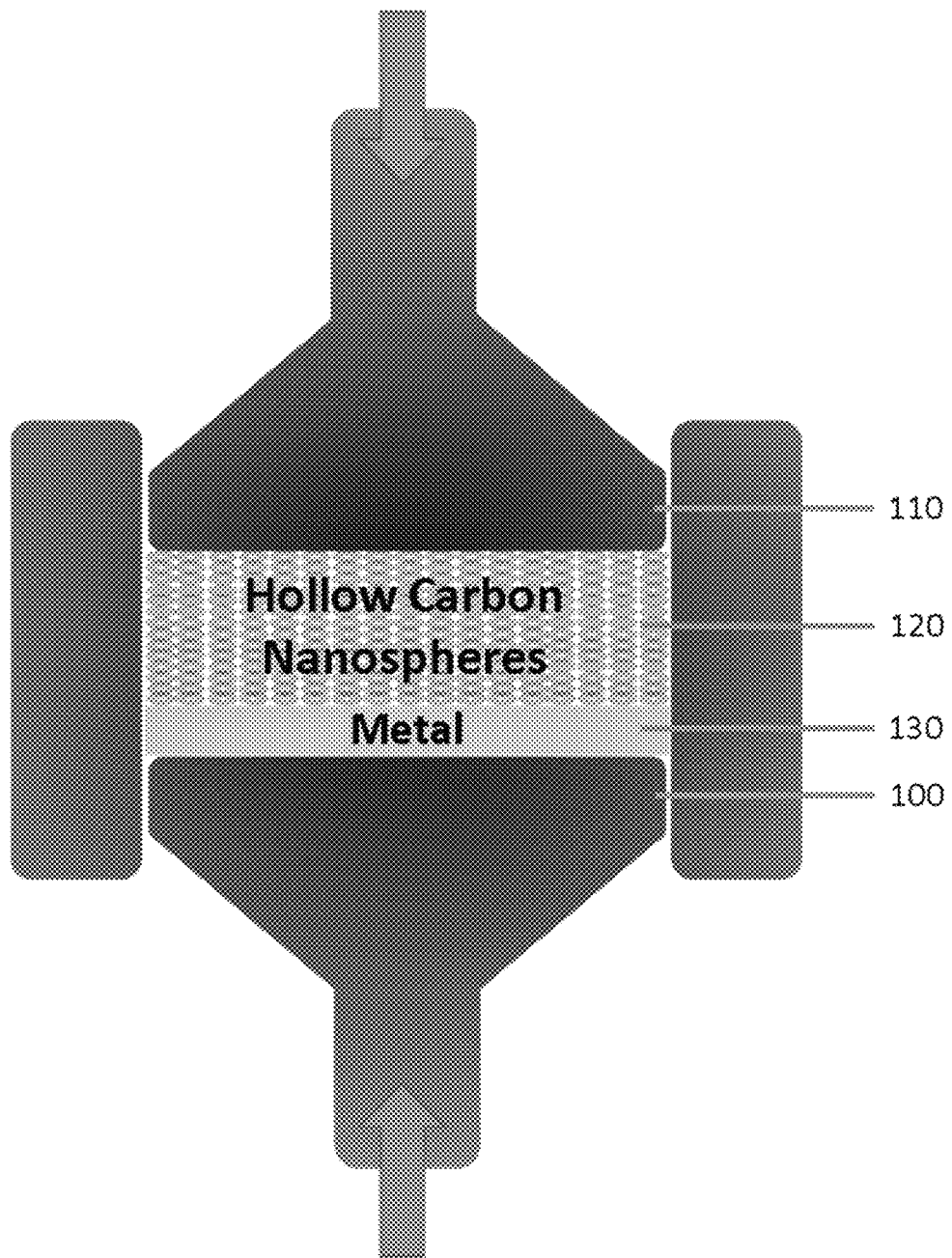
FIG. 1 is a schematic illustration of a hot pressing apparatus.

Hot pressing refers to the application of an elevated pressure and temperature. As used herein, hollow carbon nanoparticles can be hot pressed in order to cause it to adopt an ordered structure. FIG. 1 is an illustration of an apparatus for hot pressing. The apparatus has a lower surface 100 and an upper surface 110. Either the lower surface 100 or the upper surface 110 is adapted to exert mechanical pressure toward the other. Affixed to the lower surface 100 is an optional metal structure 130, which can reduce undesirable contamination or reaction. In some instances, the lower surface 100 and optional metal structure 130 can be the same. As illustrated, hollow carbon nanoparticles 120 are disposed between the upper surface 110 and metal substrate 130, or between the upper surface 110 and the lower surface 100.

Typically, the pressure is applied along a single axis, which is perpendicular to the surface of the substrate. The applied mechanical pressure between the lower surface 100 and the upper surface 110 can range from about 10 MPa to about 120 MPa. In some instances, the pressure applied is about 40 MPa. Typically, the minimum acceptable pressure is approximately 5 MPa and the maximum acceptable pressure is approximately 1 GPa when hot pressing porous carbon nanoparticles. While the hollow carbon nanoparticles are being mechanically pressed, the heat is raised to an elevated temperature.

Hot pressing of these samples can be conducted at a temperature range of 500° C. to 2,100° C.; in some instances, hot pressing can be conducted at a temperature range of 500° C. to 600° C., which is typically more suitable for maximizing gravimetric surface area and micropore volume; in other instances, hot pressing can be conducted at a temperature range of 750° C. to 1200° C., which provides a balance of surface area, pore volume (mesopore and micropore), and density; in other instances, hot pressing can be conducted at a temperature range of 1300° C. to 2100° C., which is typically more suitable for maximizing density. Even higher temperatures are permissible, and the maximum temperature depends on the melting point of the hollow carbon nanoparticles (e.g., Ketjenblack). Typically, the minimum acceptable temperature is approximately 27° C. and the maximum acceptable temperature is approximately 2400° C.

The hot pressing process is conducted under an inert atmosphere (e.g., He, Ar or $N_2$). Typically, the hollow carbon nanoparticles are hot pressed for about 5 to 60 minutes. In some instances, the hollow carbon nanoparticles are hot pressed for about 5 minutes; in other instances, the hollow carbon nanoparticles are hot pressed for about 60 minutes. Even higher dwelling time (hot-pressing time) is permissible. Typically, the minimum acceptable time is approximately 5 minutes.

Figure 2A:
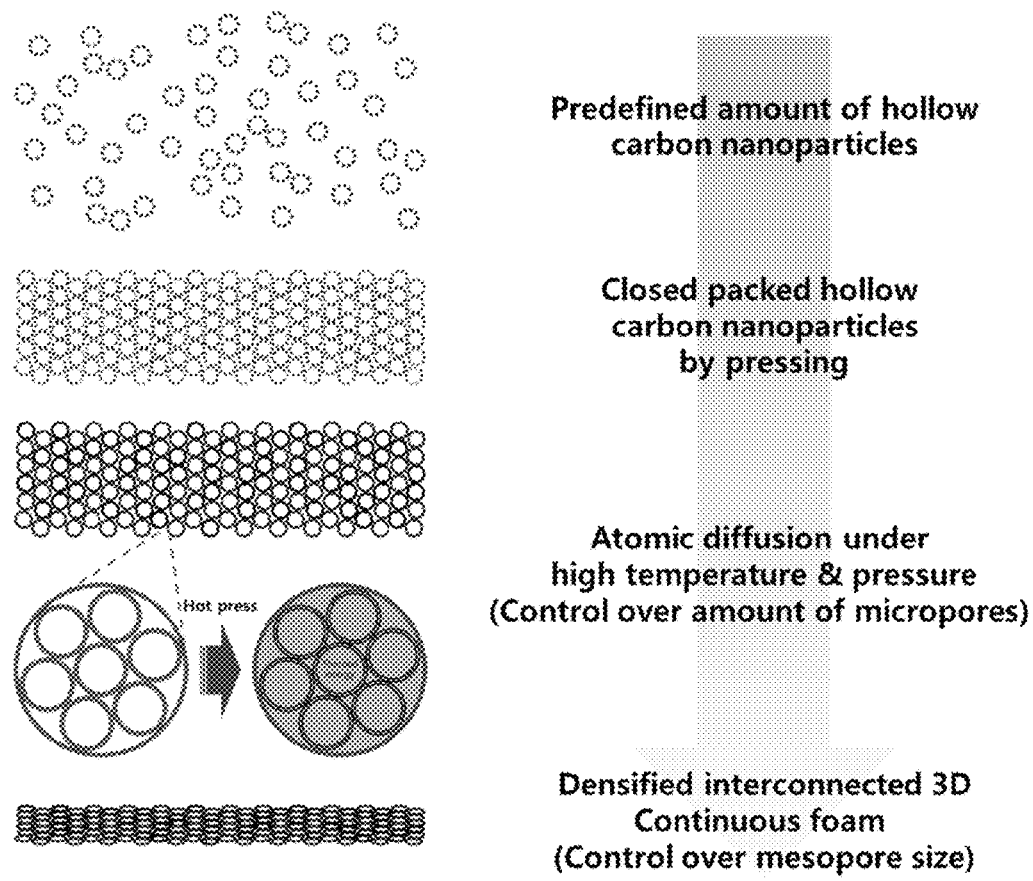
FIG. 2A is a schematic illustration of the morphological changes that occur when hot pressing hollow carbon nanoparticles to form nano-carbon foam.
Figure 2B:
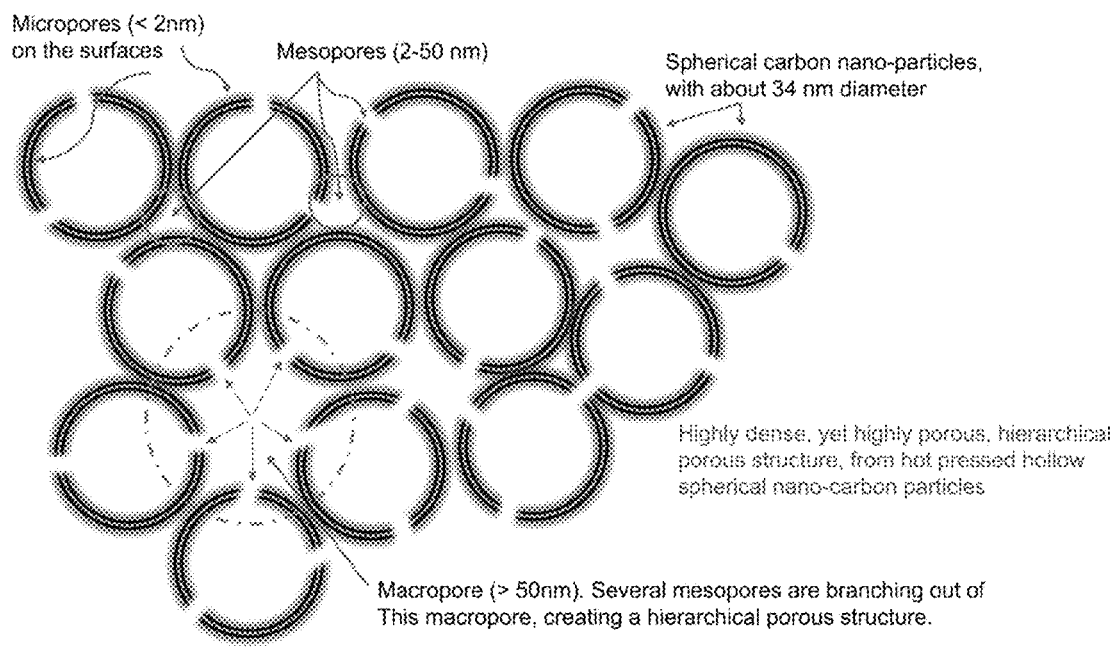
FIG. 2B is a schematic illustration of a highly dense nano-carbon foam formed by hot pressing hollow carbon nano-particles.

FIG. 2A is a schematic illustration of the morphological changes that occur when hot pressing hollow carbon nanoparticles to form nano-carbon foam. As the hollow carbon nanoparticles are pressed at an elevated temperature, they form a densified, interconnected 3D continuous foam. FIG. 2B is a schematic illustration of a highly dense nano-carbon foam formed by hot pressing hollow carbon nano-particles according to the methods described herein. For example the hollow carbon nano-particles that are hot pressed can have about 80% void volume and a radius of about 34 nm prior to the hot pressing procedure. The resulting foam is highly porous with high surface area and hierarchical porous structure, as illustrated in FIG. 2B. The porous structure is hierarchical because there are pores of varying size and there is a hierarchy in the way they are connected to each other: the biggest macropores are connected to smaller mesopores, which are again connected to smallest micropores, as illustrated in FIG. 2B. Additionally, the hot pressed densely packed arrangement of nano-spheres has a high material density. Both chemical vapor deposited (CVD) graphene foams grown using Ni foam (as a sacrificial substrate) and substrate-free type of graphene foam synthesized through the gelation method (for making aerogels) have very low densities even after 80% compression along a single axis. Those densities are 0.015 g $cc^{-1}$ and 0.075 g $cc^{-1}$, respectively, with corresponding conductivities of about 0.1 S $m^{-1}$ and 10 S $m^{-1}$, respectively. In contrast, nano-carbon foam produced according to the methods described herein is highly dense, with a density ranging from about 0.5 g $cc^{-1}$ to about 0.95 g $cc^{-1}$, and with high conductivity of at least about $10^2$ S Further, the nano-carbon foam produced by the methods herein is a self-standing structure that is free of any form of impurity (e.g., there are no chemical reagents, binders, or conductive additives), which maximize gravimetric surface area and contributes to the unique porous material.

As used herein, the term "hollow carbon nanoparticles" refers to amorphous carbon shells. Typically, amorphous carbon shells, having a radius ranging from about 5 nm to about 50 nm, are suitable for forming nano-carbon foams with high porosity. In some instances, the hollow carbon nanoparticles can have a radius of about 34 nm. Typically, hollow carbon nanoparticles have a void fraction of about 80% and surface area of about 1400 $m^2/g$. Hollow carbon nanoparticles are unique in terms of their structure and shape compared to other forms of amorphous carbons. For examples, the amorphous carbon source described in WO 2015/072926 is supplied by Asbury Carbons, Inc. (product code 5345R) has a particle size of about 30 nm to about 35 nm and is solid (not hollow) nanoparticles with a surface area of about 36 $m^2/g$. In contrast, hollow carbon nanoparticles, of which Ketjenblack EC600-JD (AkzoNobel N.V.) is one particular product, have a hollow nanospherical structure with a radius of about 34 nm (particle size about 70 nm), a void fraction of 80%, and surface area of about 1400 $m^2/g$. In general, solid carbon nanoparticles are not suitable for synthesizing a nano-carbon foam.

As used herein, the term "nano-carbon foam" refers to a material formed by hot-pressing carbon nanoparticles. The nanocarbon foam has micropores, mesopores, and optionally macropores.

It should be understood that numerical values parameters described herein are approximate. The term "about" typically refers to values that are within 10% of the stated amount.

EXEMPLIFICATION

A first experiment was performed to assess how the hot pressing temperature affects the density, gravimetric surface area, and volumetric surface area of the resulting nanocarbon foam. Ketjenblack hollow carbon nanoparticles (Product No. EC600-JD, AkzoNobel N.V.) were hot pressed at the temperatures, pressures, and times listed in Table 1. Hot pressing was performed for 5 minutes or 60 minutes, depending upon the desired properties of the obtained nanocarbon foam, e.g., to maximize the gravimetric surface area, optimize volumetric surface area, or maximize density. The Ketjenblack nanoparticles have an average radius of about 34 nm.

TABLE 1

Morphological characterization summary: Density, Gravimetric and volumetric surface area

| Temperature (° C.) | Pressure (MPa) | Dwelling Time (minutes) | Density (g cc$^{-1}$) | Gravimetric Surface Area (m$^2$ g$^{-1}$) | Volumetric Surface Area (m$^2$ cc$^{-1}$) |
|---|---|---|---|---|---|
| 500 | 40 | 5 | ~0.5 | 1139 | 569 |
| 600 | 40 | 5 | ~0.5 | 1156 | 578 |
| 800 | 40 | 5 | ~0.5 | 1127 | 563 |
| 1300 | 40 | 60 | ~0.55 | 701 | 350 |
| 1700 | 40 | 60 | ~0.6 | 330 | 198 |
| 2100 | 40 | 60 | ~0.95 | 139 | 125 |

As the temperature is increased, the gravimetric surface area decreased and the density increased. Optimization of gravimetric surface area and density permits the optimization of volumetric surface area. The optimal volumetric surface area for various applications differs depending upon the end use of the resulting nanocarbon foam. Hot pressing at about 500° C. to about 800° C. provides volumetric surface area suitable for supercapacitor application and water desalination. Hot pressing at about 600° C. provides volumetric surface area suitable for carbon capture. Hot pressing at about 2100° C. provides volumetric surface area suitable for batteries.

A second experiment was performed to assess how the hot pressing temperature affects the total pore volume, micropore volume, and mesopore volume of the resulting nano-carbon foam. Ketjenblack hollow carbon nanoparticles were hot pressed at the temperatures, pressures, and times listed in Table 2. Using a Quantachrome QUADRASORB Evo™, the N$_2$ gas adsorption-desorption isotherm curves at −196° C. were obtained and Quenched Solid Density Functional Theory (QSDFT) statistical analysis model was applied to obtain gravimetric surface area, pore size distribution, total pore volume, micropore volume and mesopore volume. The volumetric surface area is obtained from direct multiplication of the gravimetric surface area and density. The density value is obtained as apparent density from the weight of the sample divided by the geometric calculation of the volume of the bulk sample, which is of circular disc shape, as obtained from the hot pressing process due to the circular cross-sectional shape of the mold used. Micropores are those pores having a diameter of less than 2 nm. Mesopores are those pores having a diameter of 2-50 nm.

TABLE 2

Control over nature of porosity: Total pore volume, micropore volume and mesopore volume

| Temperature (° C.) | Pressure (MPa) | Dwelling Time (minutes) | Total pore volume (cc g$^{-1}$) | Micropore volume (cc g$^{-1}$) | % of micropore volume | Mesopore volume (cc g$^{-1}$) | % of mesopore volume |
|---|---|---|---|---|---|---|---|
| 600 | 40 | 5 | 1.35 | 0.19 | 14.44 | 1.15 | 85.55 |
| 800 | 40 | 5 | 1.39 | 0.18 | 12.73 | 1.22 | 87.27 |
| 1300 | 40 | 60 | 1.11 | 0.06 | 5.71 | 1.05 | 94.28 |
| 1700 | 40 | 60 | 0.58 | 0.04 | 3.68 | 0.55 | 95.49 |
| 2100 | 40 | 60 | 0.23 | 0.002 | 0.82 | 0.23 | 98.29 |

As the temperature is increased, we notice a decrease in percentage of micropore volume and an increase in the percentage of mesopore volume. The optimal percentage of micropore and mesopore volume for various applications would lie at various ranges. Hot pressing at about 500° C. to about 800° C. provides optimal percentage of micropore and mesopore volume suitable for supercapacitor application and water desalination. Hot pressing at about 600° C. provides optimal percentage of micropore and mesopore volume suitable for carbon capture.

A third experiment was performed to assess how the applied pressure affects the density of the resulting nano-carbon foam. Ketjenblack hollow carbon nanoparticles were hot pressed at the temperatures, pressures, and times listed in Table 3. Hot pressing duration was selected depending upon the desired properties of the resultant nano-carbon foam, e.g., to maximize the gravimetric surface area, optimize volumetric surface area, or maximize density. The density value is obtained as apparent density from the weight of the sample divided by the geometric calculation of the volume of the bulk sample, which is of circular disc shape, as obtained from the hot pressing process due to the circular cross-sectional shape of the mold used.

TABLE 3

Density control by pressure

| Temperature (° C.) | Pressure (MPa) | Dwelling Time (minutes) | Density (g cc$^{-1}$) |
|---|---|---|---|
| 800 | 10 | 5 | 0.36 |
| 800 | 40 | 5 | 0.49 |

TABLE 3-continued

Density control by pressure

| Temperature (° C.) | Pressure (MPa) | Dwelling Time (minutes) | Density (g cc$^{-1}$) |
|---|---|---|---|
| 800 | 80 | 30 | 0.64 |
| 800 | 120 | 60 | 0.8 |

As the pressure increased, the density of the nano-carbon foam increased. Hot pressing at about 40 MPa to about 80 MPa provides optimal density for supercapacitor application, water desalination, and carbon capture.

Figure 3A:
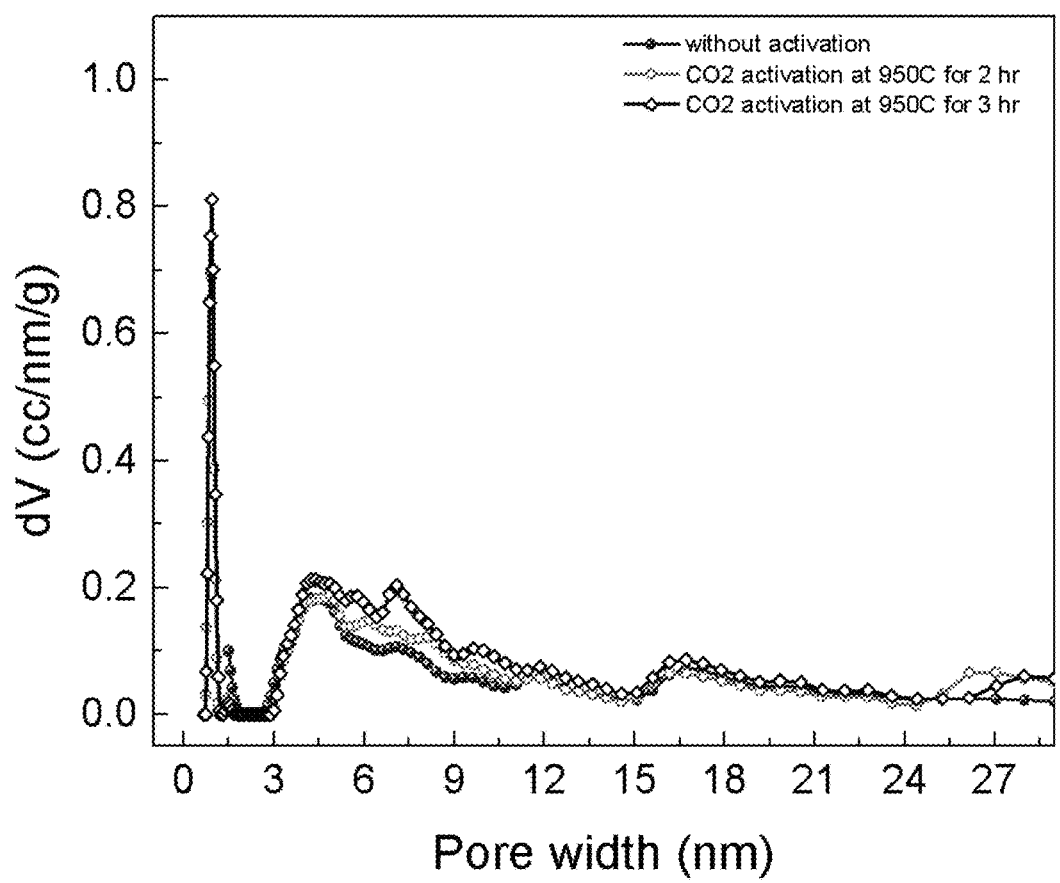
FIGS. 3A and 3B are graphs of pore size distribution of the nano-carbon foam samples, as prepared from hot pressing, and $CO_2$ activated samples. The samples were analyzed in Quantachrome QUADRASORB Evo™ surface area analysis system.
Figure 3B:
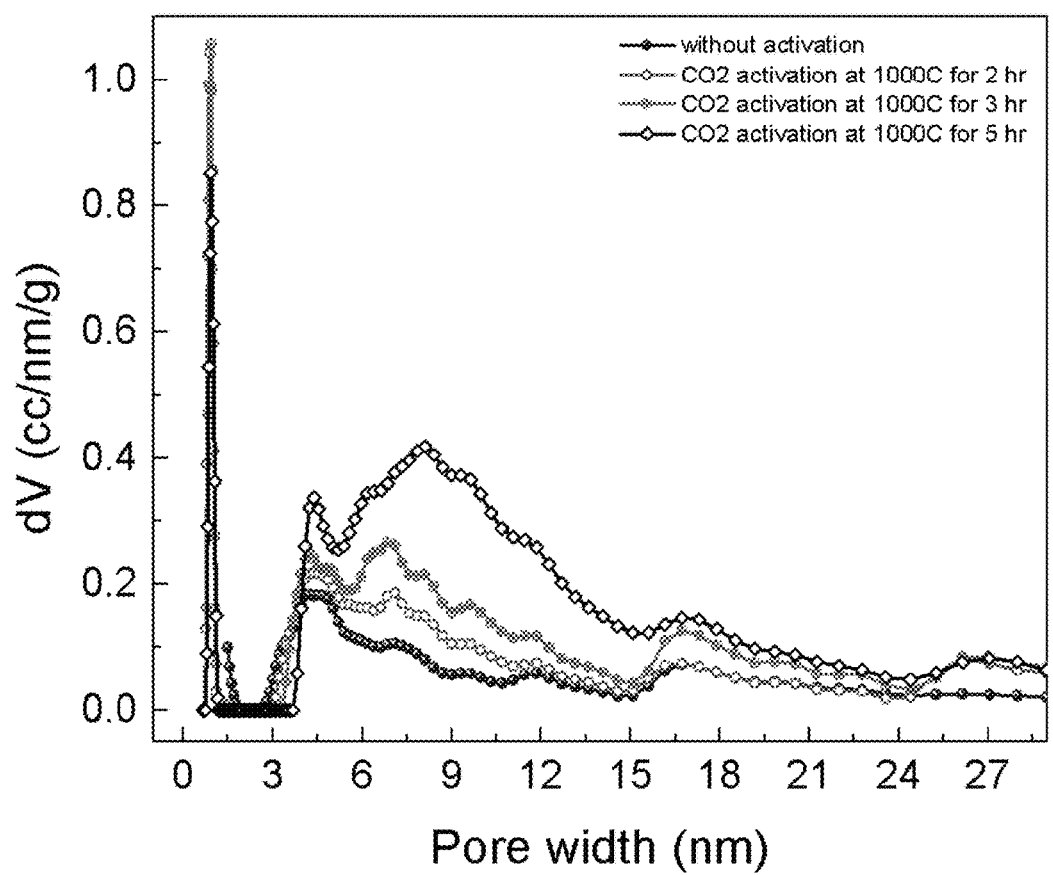

A fourth experiment was performed to assess how $CO_2$ activation of the nano-carbon foam affects the surface area of the nano-carbon foam. Ketjenblack hollow carbon nanoparticles were hot pressed at the temperatures, pressures, and times listed in Table 4. The resulting nano-carbon foam was activated by flowing $CO_2$ gas with $N_2$ carrier gas into an annealing furnace at the temperatures and pressures in Table 4. FIG. 3A shows the pore size distribution plot for samples activated at 950° C. and FIG. 3B shows the pore size distribution plot for samples activated at 1000° C.

TABLE 4

Morphological characterization summary of $CO_2$ activated sample

| Temperature (° C.) | Pressure (MPa) | Dwelling Time (minutes) | Activation condition | Surface area (m$^2$/g) |
|---|---|---|---|---|
| 500 | 40 | 5 | No | 1139 |
| 500 | 40 | 5 | $CO_2$ activation, @950° C., 2 hrs | 1212 |
| 500 | 40 | 5 | $CO_2$ activation, @950° C., 3 hrs | 1443 |
| 500 | 40 | 5 | $CO_2$ activation, @1000° C., 2 hrs | 1449 |
| 500 | 40 | 5 | $CO_2$ activation, @1000° C., 3 hr | 1678 |
| 500 | 40 | 5 | $CO_2$ activation, @1000° C., 5 hr | 2250 |

As the activation temperature is increased, the surface area of the nano-carbon foam increased. Activation at about 1000° C. for about 5 hours provides high surface area, which is more suitable for carbon capture.

Figure 4:
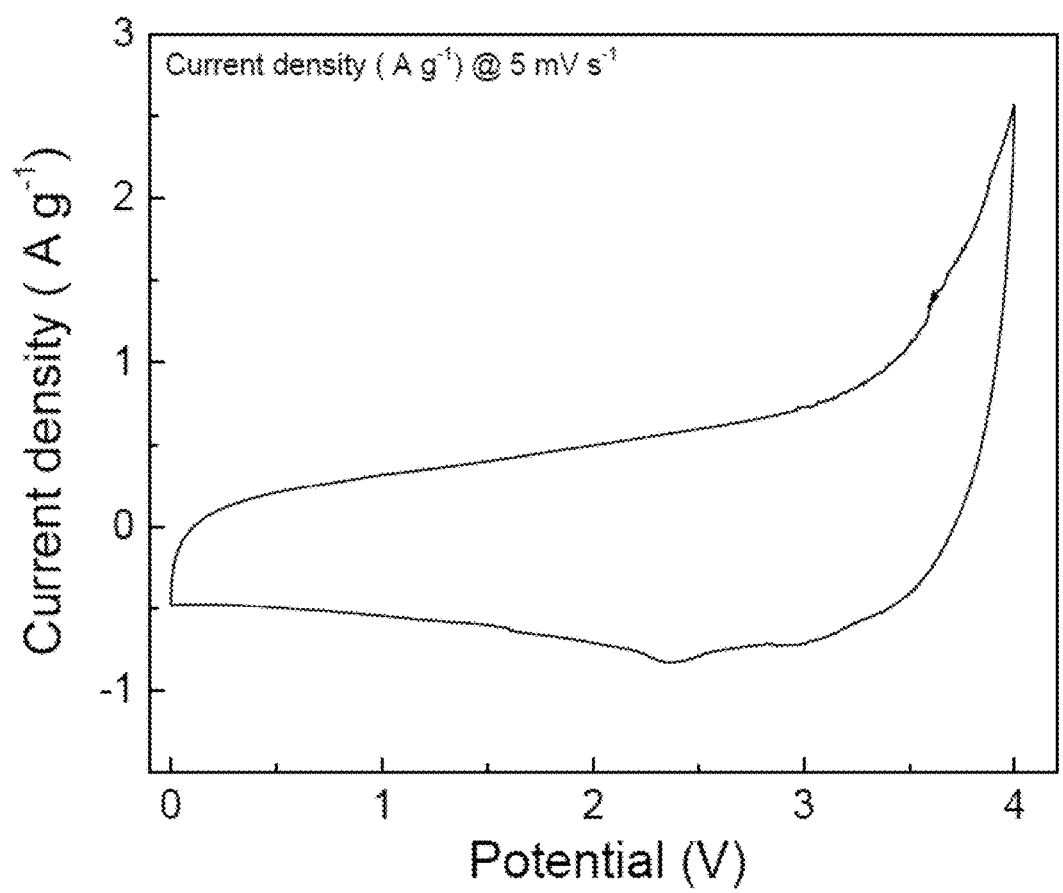
FIG. 4 is a typical cyclic voltammetry (CV) characterization of supercapacitor electrodes in coin cell configuration. The samples were analyzed in a Potentiostat-galvanostat instrument (BioLogic Model No. VSP-300).
Figure 5:
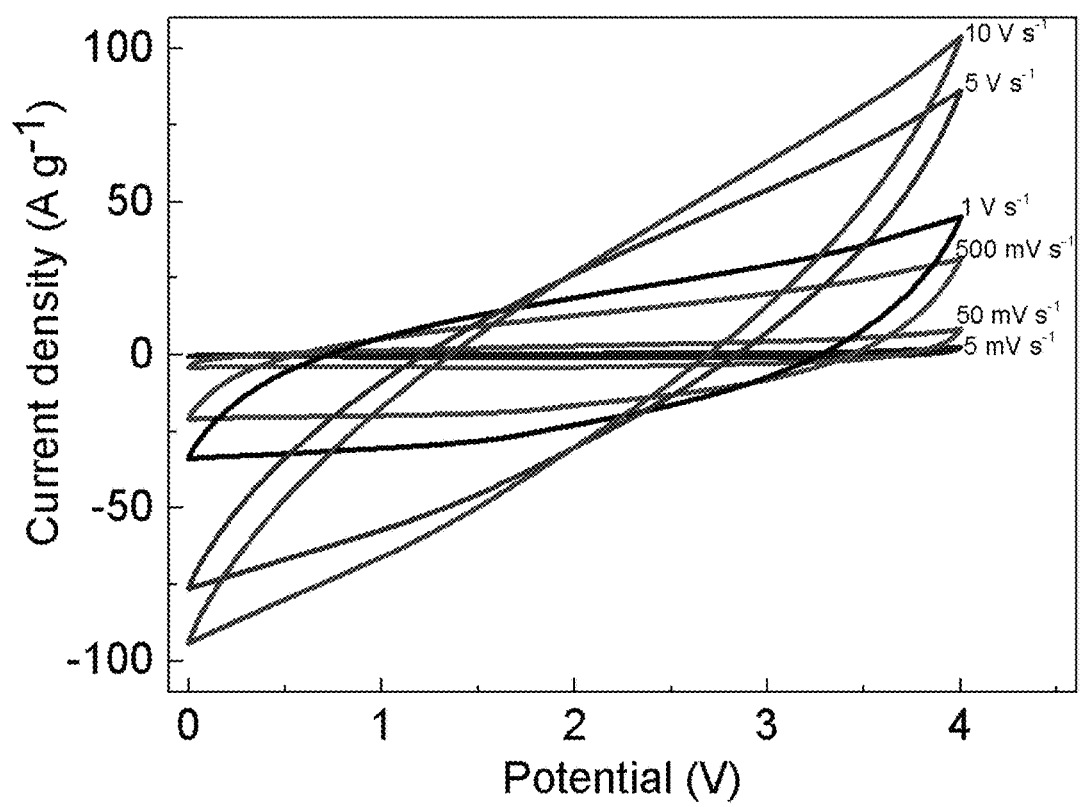
FIG. 5 is cyclic voltammetry (CV) characterization of supercapacitor electrodes in coin cell configuration at different scan rates.
Figure 6:
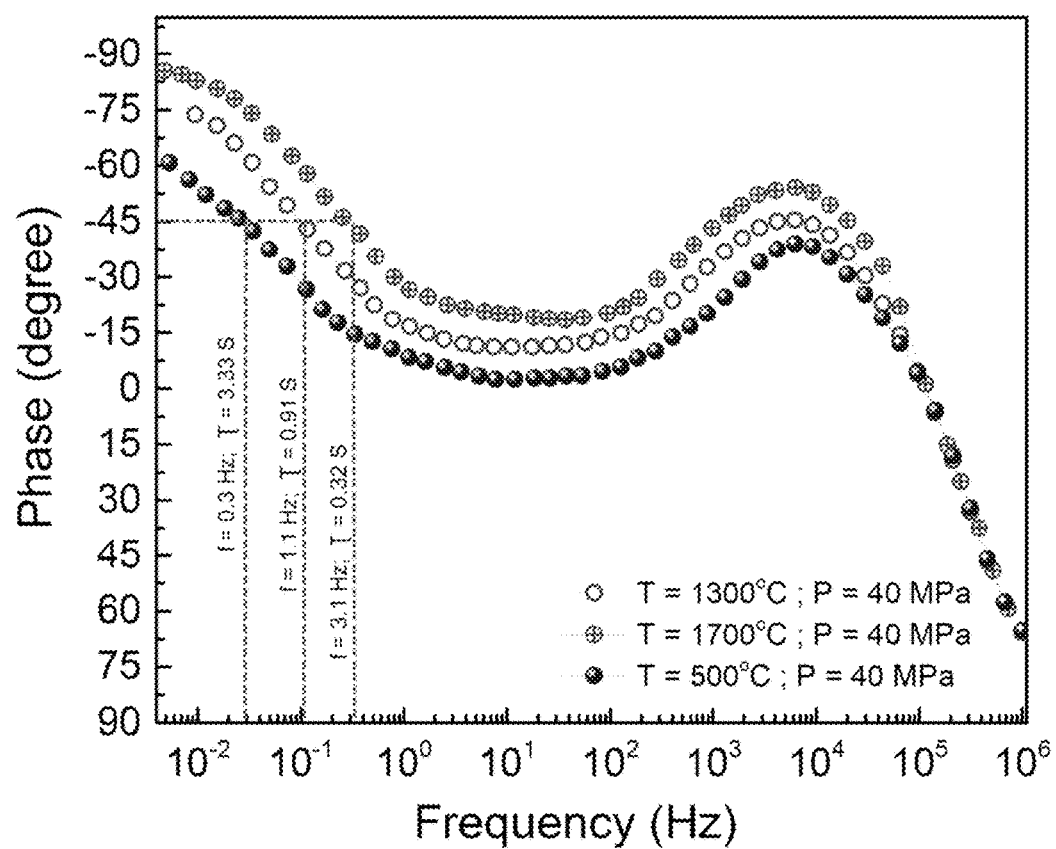
FIG. 6 is Phase (degree) vs frequency (Hz) plot from impedance spectroscopy of three different samples, carried out in coin-cell configuration, in $EMIMBF_4$ electrolyte. The samples were analyzed in Potentiostat-galvanostat instrument, the model is BioLogic VSP-300

A fifth experiment was performed to assess supercapacitor performance. FIG. 4 is a cyclic voltammetry (CV) characterization of supercapacitor electrodes in coin cell configuration at 5 mVs$^{-1}$ scan rate. A total of 251 Fg$^{-1}$ capacitance was obtained using ionic liquid electrolyte (EMIMBF$_4$) at a potential window of 4V. This resulted in very high energy density and power density as listed in the table below. FIG. 5 is CV performances at different scan rates. FIG. 6 compares the rate capability (the characteristic time constants (τ)) of samples, hot pressed at different temperatures. A smaller characteristic time constant refers to an increased rate capability. Increasing temperature increases relative percentage of mesopores in the samples (Table 2), and mesopores increases rate capability (i.e. reduces τ). The results are summarized in Table 6. This illustrates how changing hot pressing parameters can control supercapacitor performance through controlling nature of porosity.

TABLE 5

Supercapacitor performance

| Sample | Capacitance (F/g) | Potential window (V) | Gravimetric Energy density (Wh/Kg) | Gravimetric Max. Power density (W/kg) | Volumetric Energy density (Wh/L) | Vol. Max Power density (W/L) |
|---|---|---|---|---|---|---|
| 500° C. 40 MPa 5 mins | 251 | 4 | 138.45 | 1.98 × 10$^6$ | 111.2 | 1.41 × 10$^6$ |

TABLE 6

Rate capability controlled by nature of porosity

| Sample | % of micropore volume | % of mesopore volume | Characteristic frequency (Hz) | Characteristic time constant τ (s) |
|---|---|---|---|---|
| 500° C. 40 MPa 5 mins | 14.44 | 85.55 | 0.03 | 33.33 |
| 1300° C. 40 MPa 60 mins | 5.71 | 94.28 | 0.11 | 9.1 |
| 1700° C. 40 MPa 60 mins | 3.68 | 95.49 | 0.31 | 3.2 |

Figure 7:
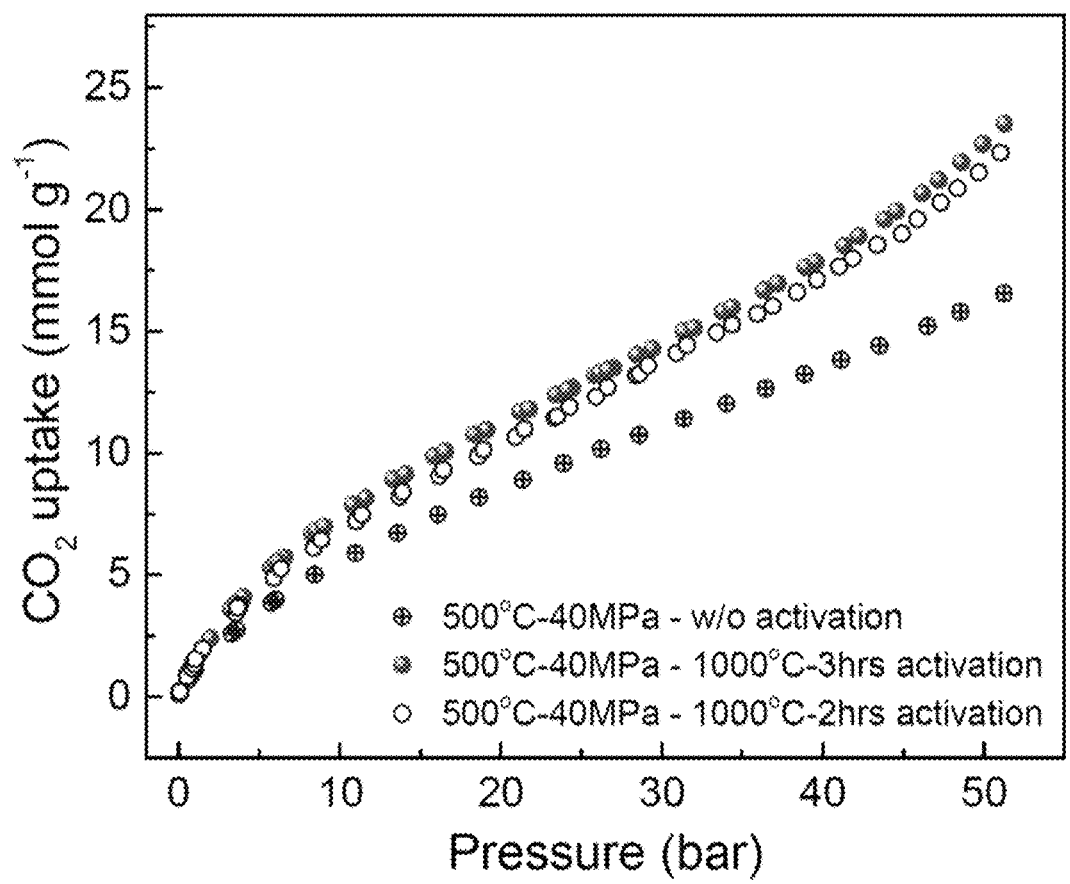
FIG. 7 is $CO_2$ uptake (mmol $g^{-1}$) per unit gram of the sample with respect to adsorption pressure (bar). The samples were analyzed in Quantachrome, iSorbHP1, high pressure gas adsorption system.

A sixth experiment was performed to assess $CO_2$ capture and storage using three of the samples from the fourth experiment. Using the Quantachrome iSorb HP1, a $CO_2$ adsorption-desorption isotherm curve at 25° C. was obtained which provides directly the amount of $CO_2$ adsorbed per gram of the nano-carbon foam. FIG. 7 describes $CO_2$ uptake (mmol/g) per unit gram of the sample with respect to adsorption pressure (bar).

TABLE 7

Carbon capture and storage performance

| Surface area (m$^2$/g) | $CO_2$ storage per unit amount of absorbents (mmol/g) |
|---|---|
| 1139 | 15.5 @ 50 bar |
| 1449 | 21.5 @ 50 bar |
| 1678 | 22.5 @ 50 bar |

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of making nano-carbon foam, comprising:
   hot pressing hollow carbon nanoparticles:
   i) at a pressure between about 10 MPa and about 120 MPa;
   ii) at a temperature between about 500° C. and about 2100° C.; and
   iii) for a duration between about 5 minutes and about 60 minutes,
   to form a nano-carbon foam.

2. The method of claim 1, wherein the pressure is about 40 MPa.

3. The method of claim 1, further comprising the step of activating the nano-carbon foam with $CO_2$.

4. The method of claim 1, where the nano-carbon foam has a volumetric surface area between about 125 $m^2\ cc^{-1}$ and 578 $m^2\ cc^{-1}$.

5. The method of claim 1, wherein the nano-carbon foam has a total pore volume between about 0.23 $cc\ g^{-1}$ and 1.35 $cc\ g^{-1}$.

6. The method of claim 1, wherein the nano-carbon foam has a micropore volume between about 0.002 $cc\ g^{-1}$ and 0.19 $cc\ g^{-1}$.

7. The method of claim 1, wherein the nano-carbon foam has a mesopore volume between about 0.23 $cc\ g^{-1}$ and 1.22 $cc\ g^{-1}$.

8. The method of claim 1, wherein the nano-carbon foam a density between about 0.361 $g\ cc^{-1}$ and 0.95 $g\ cc^{-1}$.

9. The method of claim 1, wherein the hollow carbon nanoparticles have a void fraction of at least 80%.

10. The method of claim 1, wherein the hollow carbon nanoparticles have a surface area of at least 1400 $m^2/g$.

\* \* \* \* \*